US012679261B2

(12) United States Patent
Wearmouth et al.

(10) Patent No.: US 12,679,261 B2
(45) Date of Patent: Jul. 14, 2026

(54) SEAT ASSEMBLY

(71) Applicant: Lear Corporation, Southfield, MI (US)

(72) Inventors: Richard James Wearmouth, Durham (GB); Neil Prideaux, Coventry (GB)

(73) Assignee: Lear Corporation, Southfield, MI (US)

( * ) Notice: Subject to any disclaimer, the term of this patent is extended or adjusted under 35 U.S.C. 154(b) by 168 days.

(21) Appl. No.: 18/524,073

(22) Filed: Nov. 30, 2023

(65) Prior Publication Data

US 2025/0178500 A1    Jun. 5, 2025

(51) Int. Cl.
*B60N 2/58*    (2006.01)

(52) U.S. Cl.
CPC ......... *B60N 2/5825* (2013.01); *B60N 2/5875* (2013.01); *B60N 2/5883* (2013.01)

(58) Field of Classification Search
CPC .. B60N 2/5825; B60N 2/5875; B60N 2/5883; B60N 2/609
USPC ... 297/452.62, 218.4, 452.6, 452.41, 228.11, 297/228.13, 218.3
See application file for complete search history.

(56) References Cited

U.S. PATENT DOCUMENTS 2,807,314 A * 9/1957 Daniel ................. B60N 2/6027
297/229
4,834,458 A * 5/1989 Izumida ................... A47C 7/18
297/452.56

4,865,383 A 9/1989 Sbaragli
5,603,275 A 2/1997 Kawasaki
5,768,758 A 6/1998 Deignan
5,858,159 A * 1/1999 Holbrook .............. B29C 63/025
156/278
6,592,181 B2 * 7/2003 Stiller .................. B60N 2/5816
297/452.6
8,708,418 B2 4/2014 Mizobata
9,168,854 B2 * 10/2015 Ursino ................ B60N 2/7094
2013/0127216 A1 5/2013 Nguyen

FOREIGN PATENT DOCUMENTS

DE    102004044714 B4    4/2006
DE    102004047164 B4    4/2006
DE    102006028210 B3    1/2008
DE    102008062347 A1    6/2010
EP    0672557 B1    9/1995
EP    1712409 A1    10/2006

* cited by examiner

*Primary Examiner* — Milton Nelson, Jr.
(74) *Attorney, Agent, or Firm* — McGarry Bair PC

(57)    ABSTRACT

A seat assembly comprises a frame and a cushion assembly connected to the frame. The cushion assembly can include a cushion portion, a trim cover disposed at a first side of the cushion portion, a first fabric portion disposed at a second side of the cushion portion, a second fabric portion connected to the first fabric portion, a sleeve, and a cord disposed partially in the sleeve. The cord can include a first end connected to the frame and a second end connected to the frame.

9 Claims, 9 Drawing Sheets

400

Form fabric assembly — 402

Dispose cord partially in sleeve — 404

Attach hooks — 406

Insert ends(s) into pocket — 408

Mold cushion with fabric assembly — 410

Attach trim cover to front side of cusion — 412

Connect bladder to seat frame — 414

Dispose cushion on seat frame — 416

Remove end(s) from pocket — 418

Connect end(s) to seat frame — 420

SEAT ASSEMBLY

TECHNICAL FIELD

The present disclosure generally relates to seat assemblies, including seat assemblies that can, for example, be utilized in connection with vehicles.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, and components have not been described in detail so as not to unnecessarily obscure aspects of the embodiments.

Figure 1:
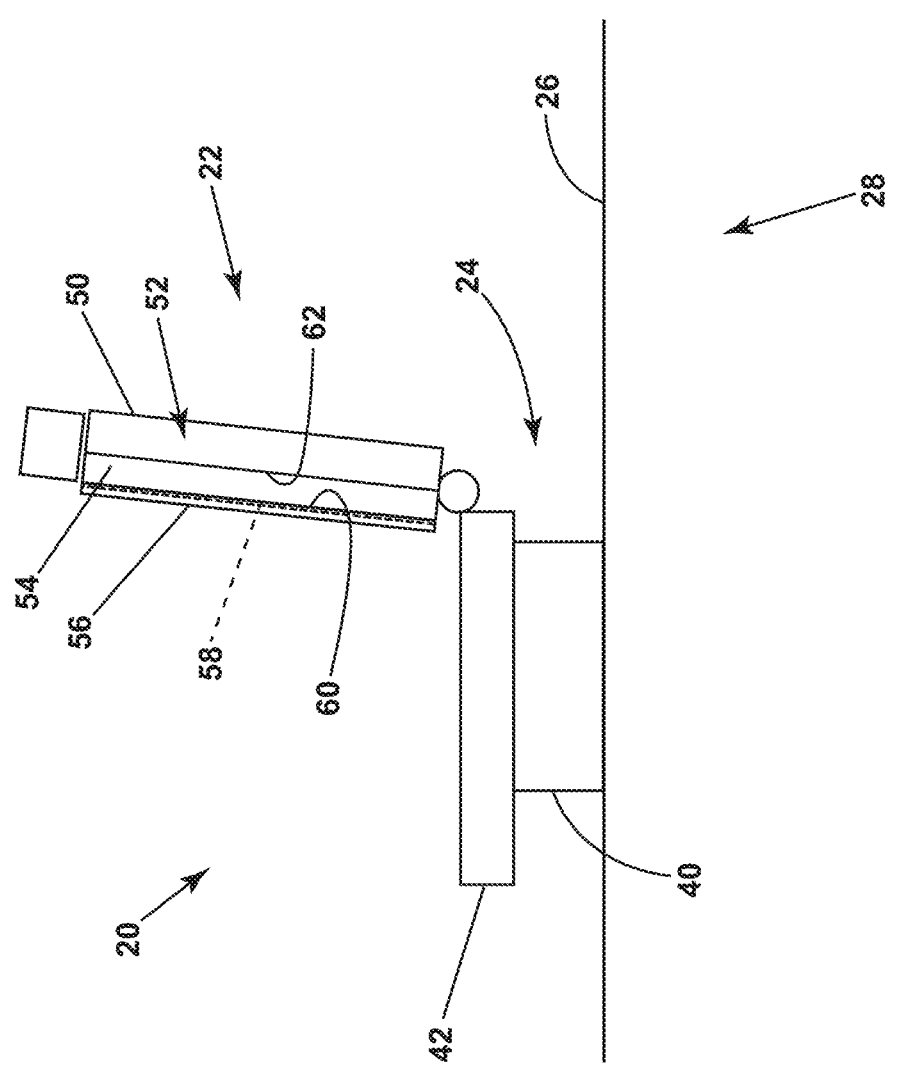
FIG. 1 is a side view generally illustrating an embodiment of a seat assembly according to teachings of the present disclosure.

Referring to FIG. 1, a seat assembly 20 is illustrated with a seat back 22 and a seat base 24. The seat back 22 is connected (e.g., rotatably) to the seat base 24. The seat base 24 is connected to a mounting surface 26, which can, for example, include a floor of a vehicle 28 in vehicle applications. The seat base 24 includes a seat base frame 40 and a seat base cushion assembly 42. The seat base frame 40 is connected to and at least partially supports the seat base cushion assembly 42. The seat base frame 40 is connected to the mounting surface 26, such as via a track assembly. The seat back 22 includes a seat back frame 50 and a seat back cushion assembly 52. The seat back cushion assembly 52 is connected to the seat back frame 50. The seat back cushion assembly 52 includes a seat back cushion portion 54 and a seat back trim cover 56. As some or all descriptions of the seat back frame 50, the seat back cushion assembly 52, the seat back cushion portion 54, and the seat back trim cover 56 of the seat back 22 can also apply to the seat base 24, the seat back frame 50, the seat back cushion assembly 52, the seat back cushion portion 54, and the trim cover 56 will be referred to as the seat frame 50, the cushion assembly 52, the cushion portion 54, and the trim cover 56. The trim cover 56 is connected to a first side 60 (e.g., a front or A side) of the cushion portion 54, such as via bonding and/or an adhesive 58 (e.g., hot glue). The cushion portion 54 can, for example, comprise foam. The seat frame 50 can, for example, include a plastic (e.g., a plastic sufficiently strong/rigid to support the cushion assembly 52 and the forces associated with an occupant).

Figure 2:
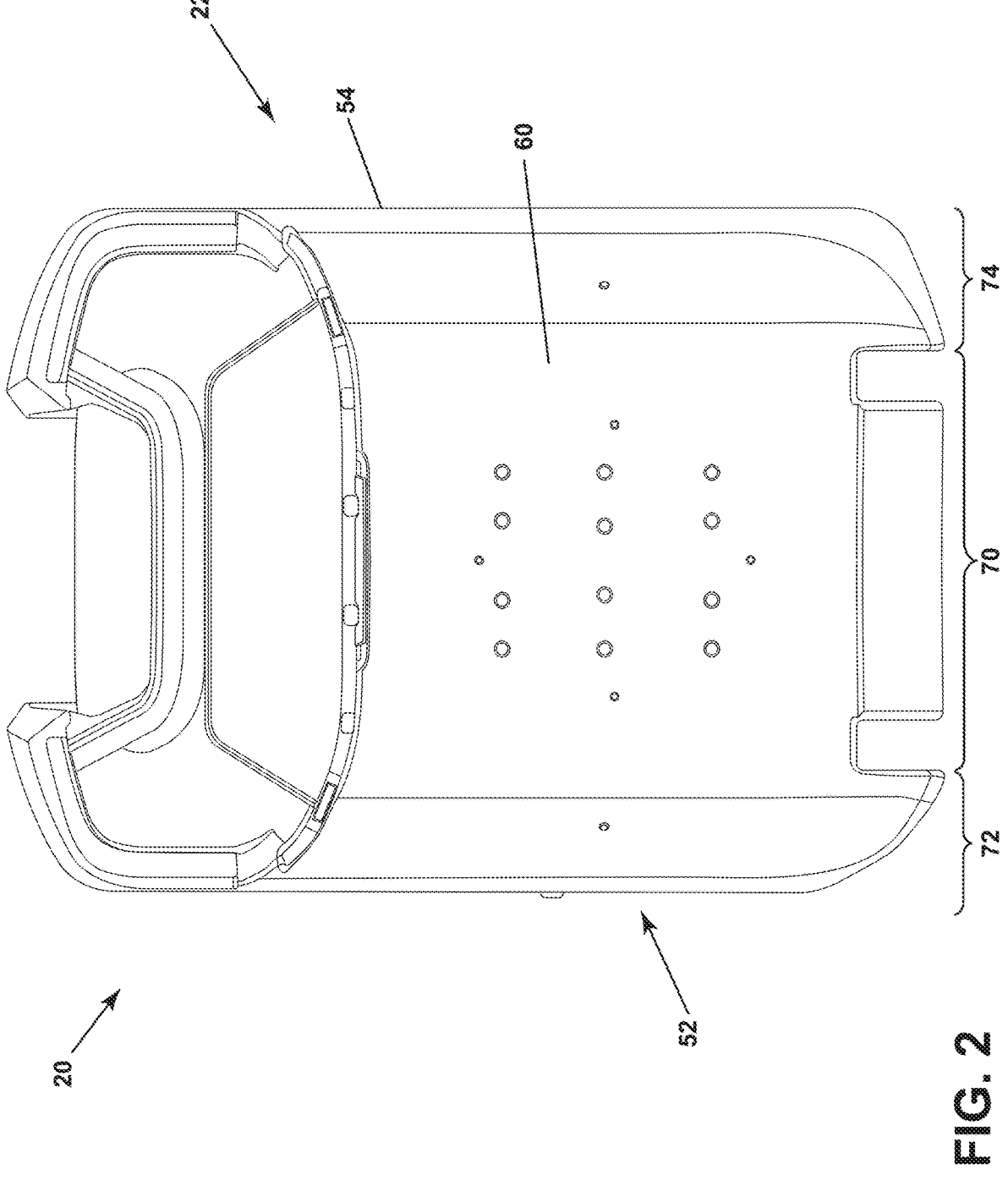
FIG. 2 is a front view generally illustrating an embodiment of a seat back, with a trim cover hidden, according to teachings of the present disclosure.
Figure 3:
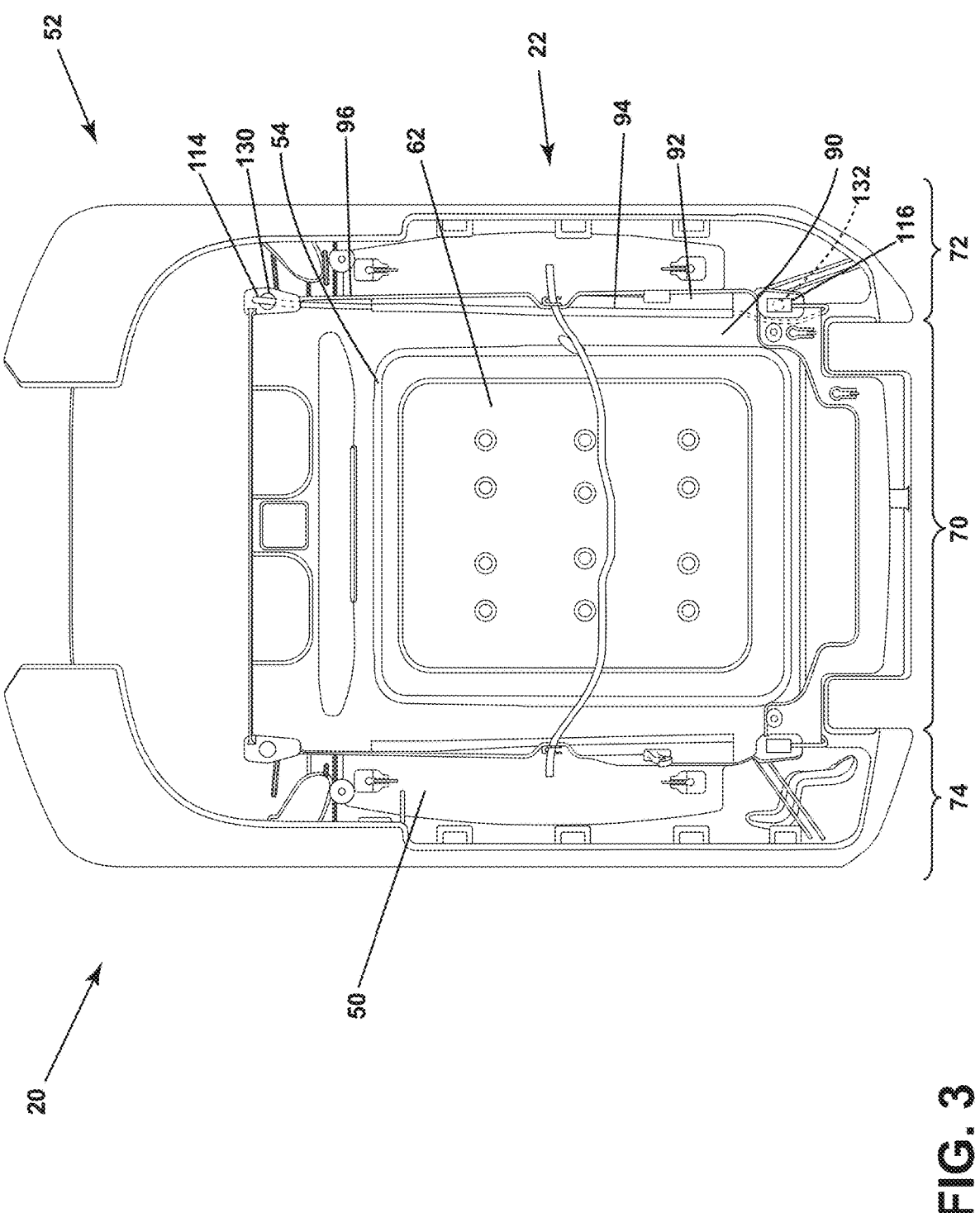
FIG. 3 is a rear view generally illustrating an embodiment of a seat back, with a trim cover hidden, according to teachings of the present disclosure.

Referring to FIG. 2, the cushion portion 54 includes a middle portion 70, a first bolster 72 disposed at a first side of the middle portion 70, and a second bolster 74 disposed at a second side of the middle portion 70. Referring to FIG. 3, the cushion assembly 52, includes a first/base fabric portion 90, a second fabric portion 92, a sleeve 94, and a cord 96. The first fabric portion 90 is disposed at a second side 62 (e.g., a rear or B side) of the cushion portion 54, which is opposite the first side 60. The second fabric portion 92 is connected to the first fabric portion 90. The sleeve 94 is connected to and/or at least partially defined by the second fabric portion 92. The cord 96 is disposed partially in the sleeve 94. The fabric portions 90, 92 can include one or more of a variety of fabrics and/or other materials. For example and without limitation, the first fabric portion 90 can include felt and/or the second fabric portion 92 can include fleece. At least a portion of the first fabric portion 90, the second fabric portion, the sleeve 94, and/or the cord 96 are aligned with the first bolster 72, such as behind the first bolster 72 between the first bolster 72 and the seat frame 50.

Figure 4:
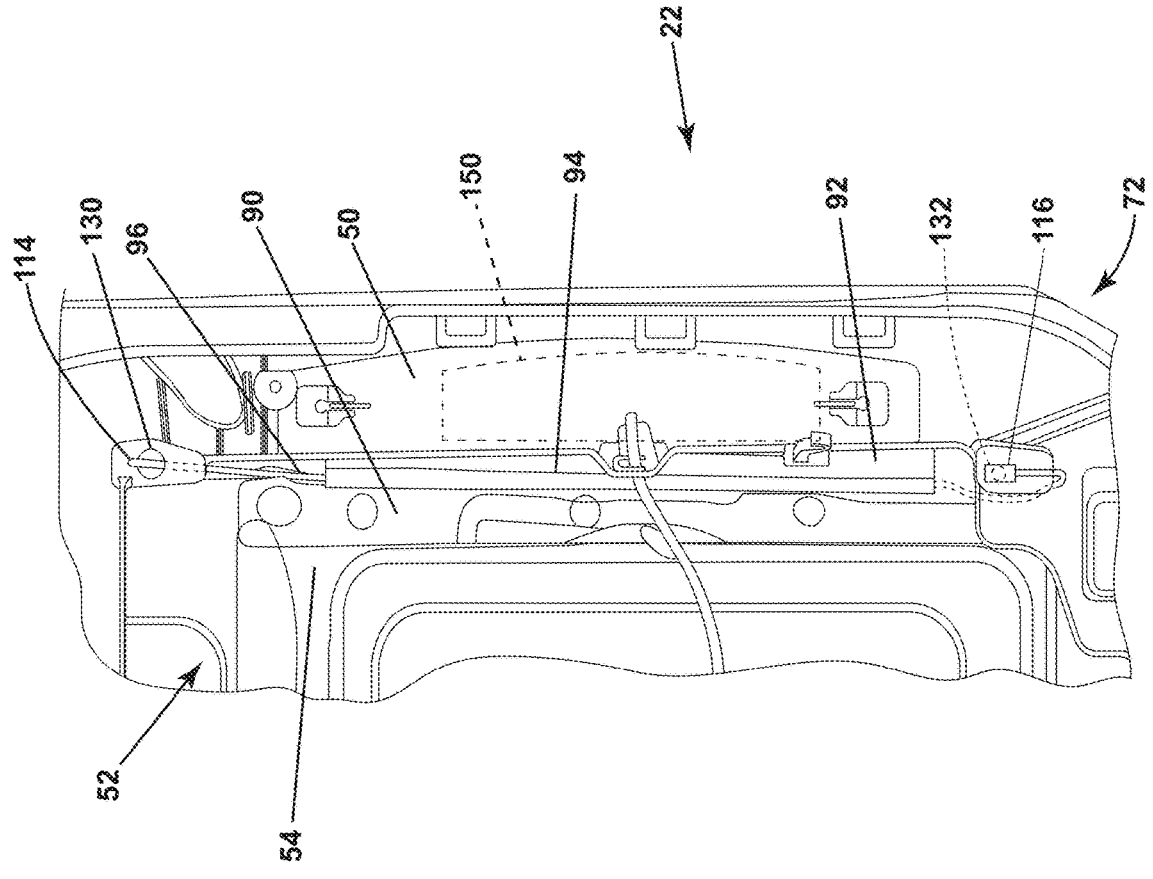
FIG. 4 is an enlarged portion of FIG. 3.
Figure 4:
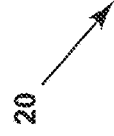

Referring to FIG. 4, at least some of the first fabric portion 90 and/or the second fabric portion 92 are disposed between the cushion portion 54 and the seat frame 50. For example, some or all of the first fabric portion 90 and/or the second fabric portion 92 can be disposed between the first bolster 72 and the seat frame 50. The cord 96 includes a first end 110 and a second end 112 opposite the first end 110. A first hook 114 is connected to the first end 110. A second hook 116 is connected to the second end 112. In the illustrated assembled configuration, the first hook 114 is engaged with a first engagement formation 130 of the seat frame 50 and the second hook 116 is engaged with a second engagement formation 132 of the seat frame 50. The engagement portions 130, 132 can, for example, include one or more of a lip, an aperture, or a recess, among other formations. Engagement of the hooks 114, 116 with the engagement portions 130, 132 connects the cushion assembly 52 with the seat frame 50.

Figure 5:
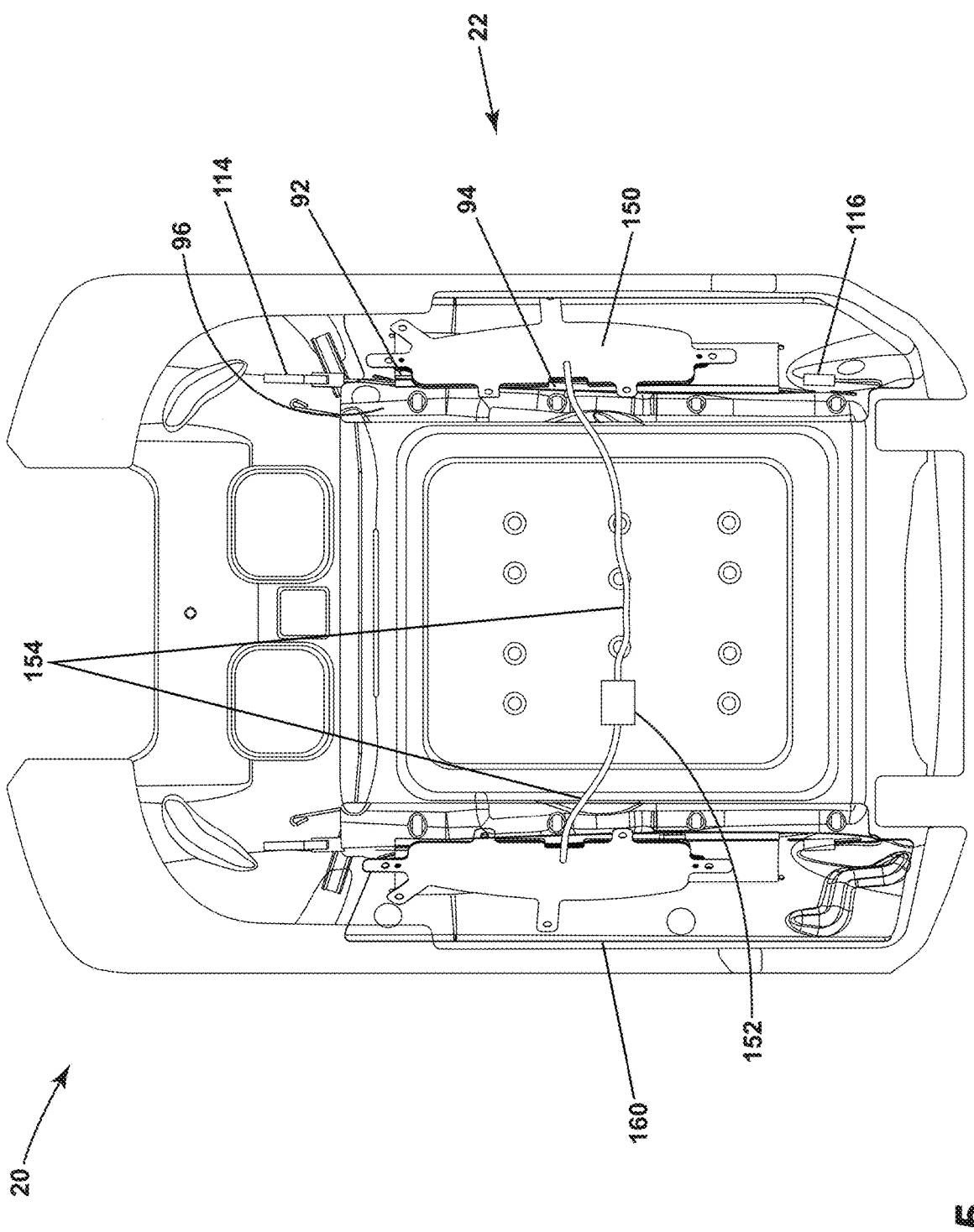
FIG. 5 is a rear view generally illustrating an embodiment of a seat back, with a trim cover and seat frame hidden, according to teachings of the present disclosure.

Referring to FIGS. 4 and 5, the seat assembly 20, illustrated in connection with the seat back 22, includes a fluid bladder 150 that is disposed at least partially between the cushion assembly 52 and the seat frame 50, such as at least partially between the seat frame 50 and the fabric portions 90, 92, which may be at least partially aligned with the first bolster 72. The fluid bladder 150 can, for example, be in direct contact with the seat frame 50, the first fabric portion 90, and/or the second fabric portion 92. The materials of the fabric portions 90, 92 may be selected, at least in part, to limit abrasion with the fluid bladder 150. The fluid bladder 150 is selectively inflatable to modify one or more characteristics of the seat back 22, such as to provide a massage, a hugging effect, or a notification, among others. For example, the fluid bladder 150 is fluidly coupled with a fluid/pressure source 152 (e.g., a pump) via one or more fluid conduits 154 (e.g., pipes, tubes, etc.). Inflating the fluid bladder 150 applies forces to the seat frame 50 and/or the cushion assembly 52. For example, the forces generally push portions of the cushion assembly 52 away from the seat frame 50. The cord 96 restricts movement of the cushion assembly 52 away from the seat frame 50 such that some movement is permitted to allow for seat characteristic modification (e.g., massage, hugging, notifying, etc.), but the extent of the movement is limited to a threshold amount (e.g., a predetermined threshold). For example, the cord 96 can include one or more elastic materials that permit stretching of the cord 96, at least to some degree, when the fluid bladder 150 is inflated. The elasticity and/or length of the cord 96 may correspond to the threshold.

With some configurations, such as generally in FIG. 5, the seat assembly 20 includes a plurality of fluid bladders, including the fluid bladder 150 and a second fluid bladder 160, that are connected to the seat frame 50 (FIG. 3) and/or the cushion assembly 52. The one or more fluid conduits 154 can connect the second fluid bladder 160 to the fluid source 152.

Figure 6:
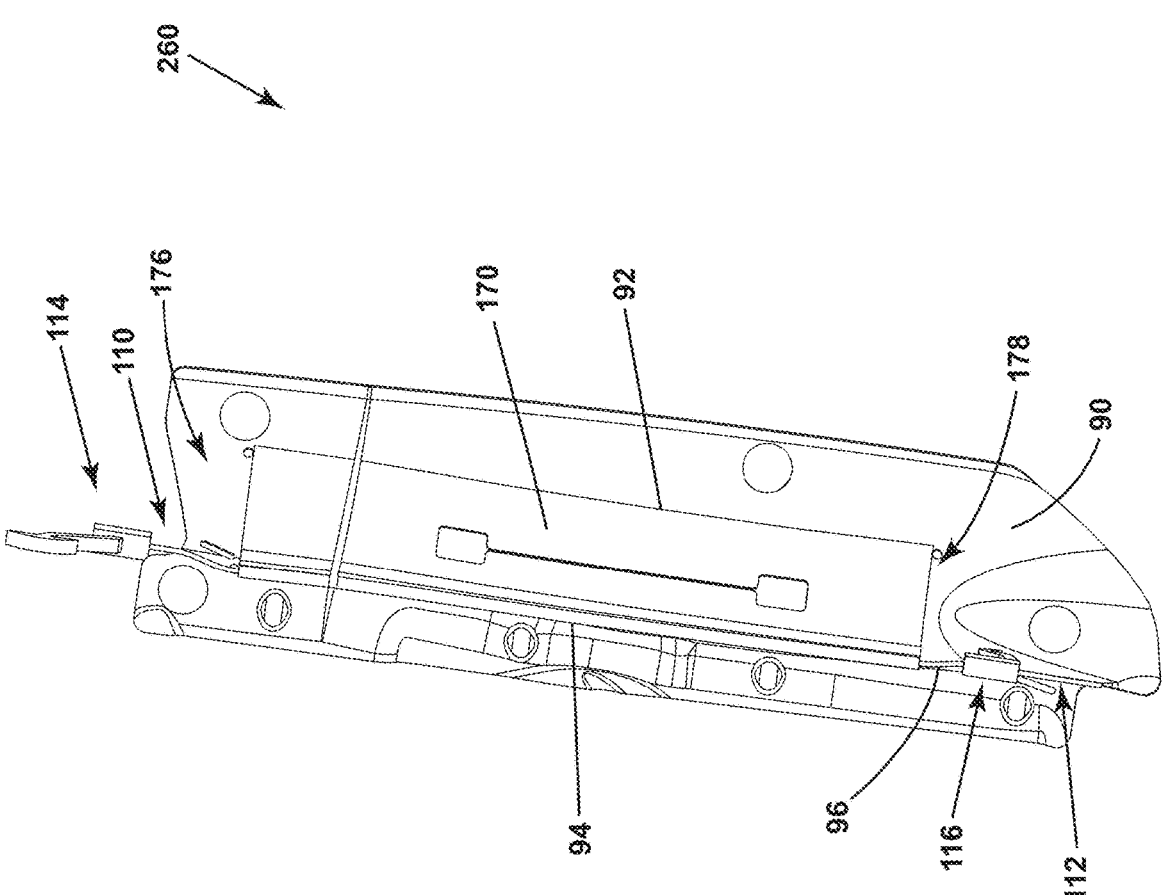
FIGS. 6 and 7 are perspective views generally illustrating embodiments of a fabric assembly, a cord, and hooks in an unstowed configuration and a stowed configuration, respectively, according to teachings of the present disclosure.

Referring to FIG. 6, the first fabric portion 90, the second fabric portion 92, the sleeve 94, the cord 96, the first hook 114, and the second hook 116 are illustrated and the seat frame 50 (FIG. 3) is hidden. The ends 110, 112 of the cord 96 and the hooks 114, 116 are shown in unstowed configuration in which the ends 110, 112 and the hooks 114, 116 are disposed outside of a pocket 170 of the second fabric portion 90. The hooks 114, 116 are shown in engaged positions in which they would engage the engagement formations 130, 132, respectively, of the seat frame 50 (FIG. 4). The second fabric portion 92 is attached to (e.g., sewn onto) the first fabric portion 90. The sleeve 94 is shown as integrally formed with and defined by the second fabric portion 92. For example, the sleeve 94 can be defined by a folded over section of the second fabric portion 92. However, the sleeve 94 can include other configurations. For example, the sleeve 94 can be separately formed from the second fabric portion 92, such as from one or more materials that are different than the second fabric portion, and then attached to (e.g., sewn onto) the second fabric portion 92. The cord 96 is disposed partially in the sleeve 94 such that a middle section of the cord 96 is disposed in the sleeve 94, and the first and second ends 110, 112 are disposed outside the sleeve 94. The sleeve 94 extends from a first end 176 of the second fabric portion 92 to a second end 178 of the second fabric portion 92.

Figure 7:
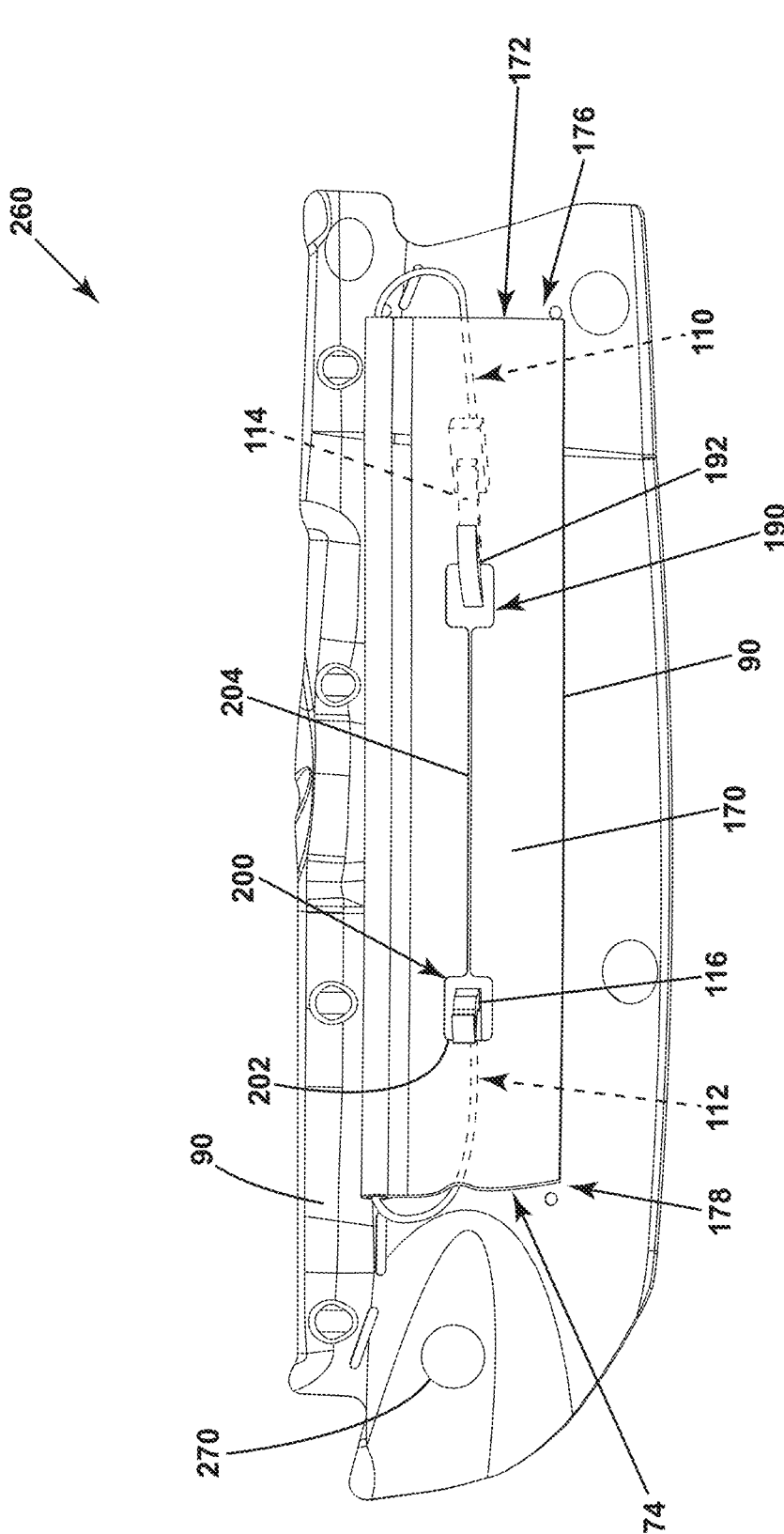

Referring to FIG. 7, the pocket 170 of the second fabric portion 92 is configured to at least partially receive the cord 96, the first hook 114, and/or the second hook 116. The cord 96 and the hooks 114, 116 are shown in a stowed configuration in which the cord 96 (e.g., the ends 110, 112), the first hook 114, and the second hook 116 are disposed at least partially in the pocket 170. The pocket 170 includes a first opening 172 and a second opening 174 opposite the first opening 172. The first opening 172 is disposed at the first end 176 of the second fabric portion 92, and the second opening 174 is disposed at the second end 178 of the second fabric portion 92 that is opposite the first end 176. The openings 172, 174 can be defined by respective sections (e.g., edges) of the second fabric portion 92 that are not directly attached to the first fabric portion 90.

The pocket 170 includes an aperture 190 that extends through the second fabric portion 92. The aperture 190 is disposed along the pocket 170 between the first opening 172 and the second opening 174 (e.g., between the first and second ends 176, 178). The aperture 190 is configured to at least partially receive the first hook 114. For example, the first hook 114 can be inserted through the first opening 172 into the pocket 170 and then at least partially into the aperture 190 such that at least a portion of the first hook 114 is disposed outside of the pocket 170. The first hook 114 may be hooked onto an inner edge 192 of the second fabric portion 92 that at least partially defines the aperture 190, such as to retain the first hook 114 and/or the first end 110 of the cord 96 at least partially in the pocket 170. The position of the aperture 190 can correspond to the length of the cord 96 that extends beyond the sleeve 94 to the first hook 114. For example, the aperture 190 can be offset from the first end 176 of the second fabric portion 92 by a distance that allows for the cord 96 to be curved or angled around from the sleeve 94 into the first opening 172 and for the first hook 114 to hook onto the inner edge 192 while limiting and/or minimizing the length of the cord 96 that is not disposed in either of the sleeve 94 or the pocket 170.

The pocket 170 can include a second aperture 200 that can be separate from or connected to the aperture 190. The second aperture 200 can be configured in a similar manner as the aperture 190, such as to at least partially receive and/or engage the second hook 116. For example, the second hook 116 may be hooked onto an inner edge 202 of the second fabric portion 92 that at least partially defines the aperture 200, such as to retain the second hook 116 and/or the second end 112 of the cord 96 at least partially in the pocket 170. The aperture 200 can be offset from the second end 178 of the second fabric portion 92 by a distance that allows for the cord 96 to be curved or angled around from the sleeve 94 into the second opening 174 and for the second hook 116 to hook onto the inner edge 202 while limiting and/or minimizing the length of the cord 96 that is not disposed in either of the sleeve 94 or the pocket 170. The apertures 190, 200 can be positioned such that when both of the hooks 114, 116 are engaged with the respective edges 192, 202, the cord 96 is under tension and/or stretched, at least to some degree. The apertures 190, 200 can be connected by a channel 204 (e.g., formed as a slit in the second fabric portion 92), which may provide increased access to the inside of the pocket 170, such as to pull the hooks 114, 116 into the pocket 170 and into engagement with the inner edges 192, 202.

Figure 8:
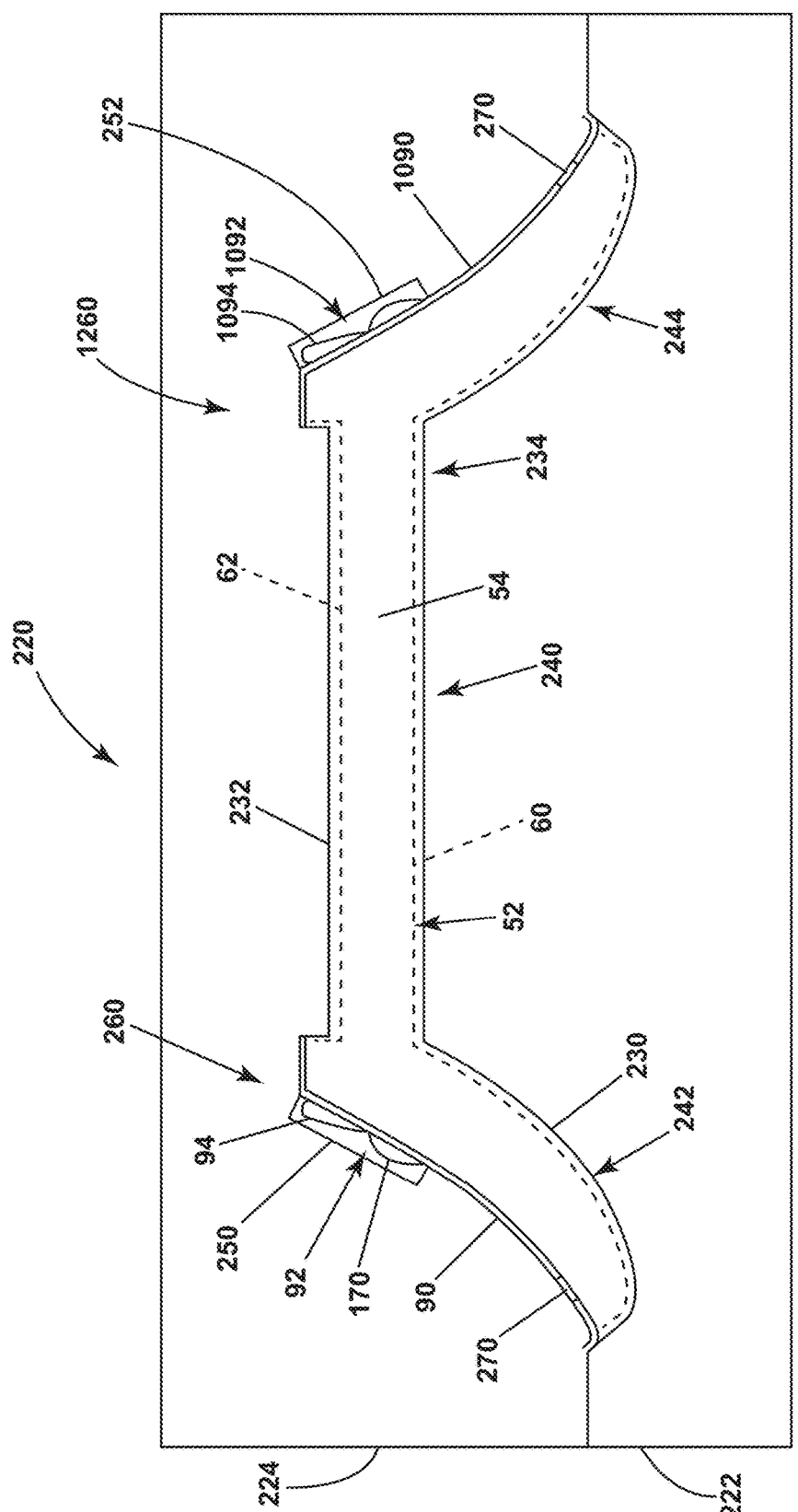
FIG. 8 is a schematic view generally illustrating an embodiment of a mold for forming portions of a seat assembly, and fabric assemblies disposed therein, according to teachings of the present disclosure.

Referring to FIG. 8, a schematic view of a mold 220 utilized in forming the cushion assembly 52 is illustrated. For example, the mold 220 is used for molding foam for the cushion portion 54 onto the first fabric portion 90. The mold 220 include a first mold member 222 (e.g., a bowl) and a second mold member 224 (e.g., a lid). The first mold member 222 includes a first contour 230 that forms the first side 60 of the cushion portion 54. The second mold member 224 includes a second contour 232 that forms the second side 62 of the cushion portion 54. When the mold members 222, 224 are brought together, the contours 230, 232 define a mold cavity 234, including a first mold cavity portion 240 for forming the middle portion 70, a second mold cavity portion for forming the first bolster 72, and a third mold cavity portion for forming the second bolster 74. Prior to forming the cushion portion 54 (e.g., before injecting foam into the cavity portions 240-244), the first fabric portion 90, the second fabric portion 92, and/or the sleeve 94 are connected together to form a fabric assembly 260 and disposed on the second contour 232 of the second mold member 224. In some configurations, the fabric assembly 260 can include the cord 96 and/or the hooks 114, 116. The second contour 232 includes a recess 250 for at least partially receiving the second fabric portion 92, the sleeve 94, the cord 96, and/or the hooks 114, 116. For example, the cord 96 and the hooks 114, 116 can be disposed in the stowed configuration when inserted into the recess 250. Optionally, an additional fabric assembly 1260, including an additional first fabric portion 1090, second fabric portion 1092, and sleeve 1094, can be disposed on the second contour 232 for molding with the cushion portion 54. The second contour 232 can include a second recess 252 for at least partially receiving the additional second fabric portion 1092 and/or the additional sleeve 1094. Optionally, the first fabric portion 90 and/or the additional first fabric portion 1090 includes one or more magnetic portions 270 for temporarily securing the first fabric portion 90, 1090 to the second mold member 224.

Figure 9:
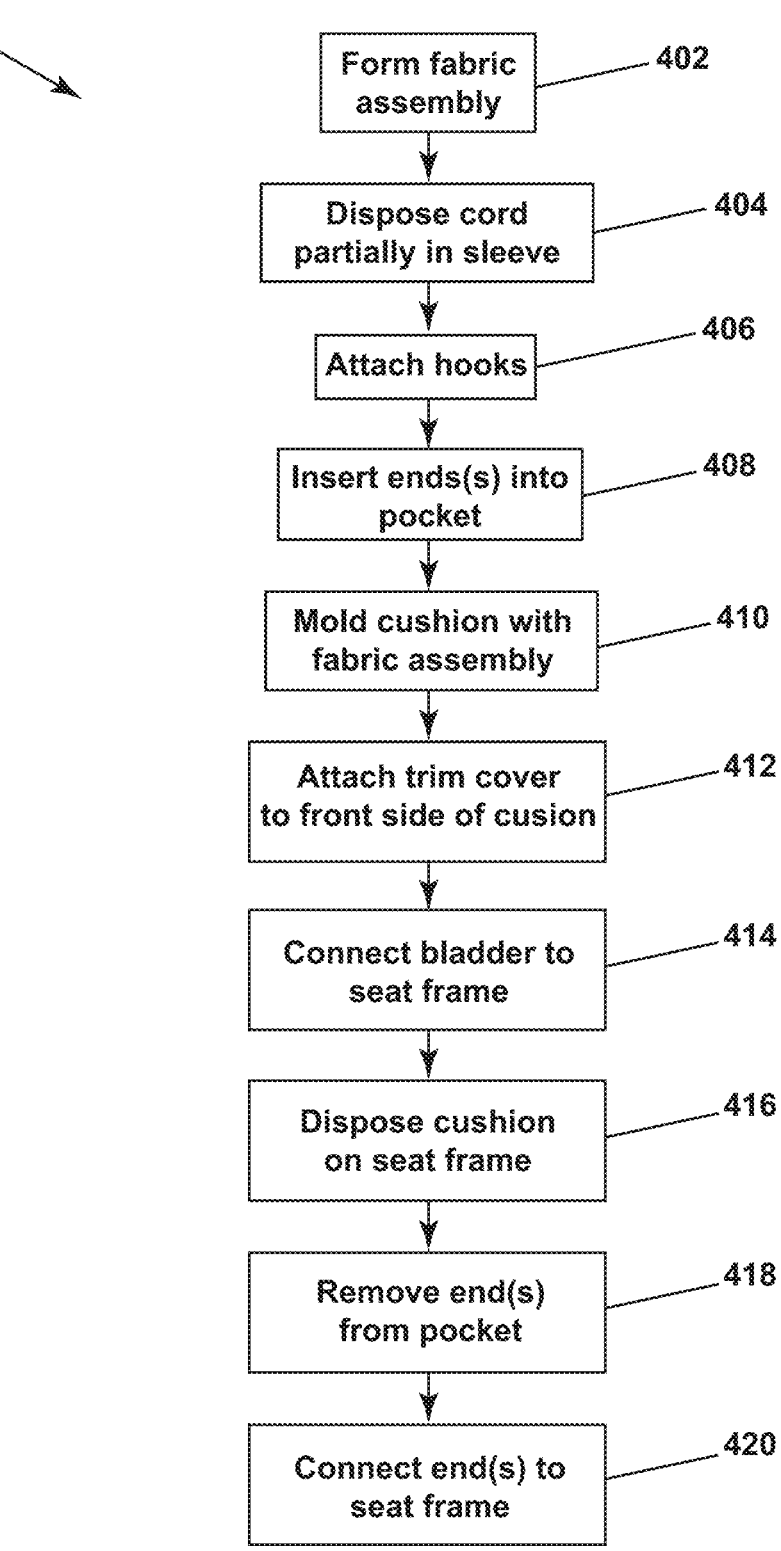
FIG. 9 is a flow diagram generally illustrating an embodiment of a method of assembling a seat assembly according to teachings of the present disclosure.

Referring to FIG. 9, a flow diagram of a method 400 for assembling a seat assembly is illustrated. The method 400 includes forming the fabric assembly 260 (block 402), which can include attaching (e.g., sewing) the second fabric portion 92 onto the first fabric portion 90. Attaching the second fabric portion 92 to the first fabric portion 90 can include forming the pocket 170, such as via sewing sides of the second fabric portion 92 to the first fabric portion 90 and not sewing at least sections of the ends 176, 178 to the first fabric portion 90. Additionally or alternatively, forming the fabric assembly 260 can include forming the sleeve 94 from the second fabric portion 92, which can include folding over a section of the second fabric portion 92 and sewing the folded over section to the other section of the second fabric portion 92 and/or the first fabric portion. Alternatively, forming the fabric assembly 260 can include separately forming the sleeve 94 and attaching (e.g., sewing) the sleeve 94 to the second fabric portion 92 and/or the first fabric portion 90.

The method 400 includes disposing the cord 96 partially in the sleeve 94 such that the ends of the cord 96 are disposed outside of the sleeve 94 (block 404). Disposing the cord 96 in the sleeve 94 can include sliding the cord 96 through the sleeve 94 or forming the sleeve 94 around the cord 96. The method 400 includes attaching the first hook 114 to the first end 110 of the cord 96 and/or attaching the second hook 116 to the second end 112 of the cord 96 (block 406).

The method 400 includes inserting the first end 110 and/or the second end 112 into the pocket 170 (block 408), which can include inserting the hooks 114, 116 at least partially into the pocket 170 and/or engaging the hooks 114, 116 with the inner edges 192, 202 such that the hooks 114, 116 are disposed partially in the pocket 170 and the apertures 190, 200, and partially outside the pocket 170. Engaging the hooks 114, 116 with the inner edges 192, 202 optionally includes stretching the cord 96 such that the cord 96 is under tension. The ends 110, 112, and the hooks 114, 116 can be disposed at least partially in the pocket 170 during various other assembly activities and/or during transportation.

The method 400 includes molding (e.g., foam open pour molding) the cushion portion 54 with/onto the fabric assembly 260 (block 410), such as onto the first fabric portion 90 and/or the second fabric portion 92. The molding can include disposing the fabric assembly 260 on the contour 232 of the second mold member 224, which can include disposing the second fabric portion 92, the sleeve 94, the cord 96 (e.g., the ends 110, 112), and/or the hooks 114, 116 at least partially in the recess 250. The foam can be formed directly on the fabric assembly 260, which can include at least some foam material entering the first fabric portion 90 and/or the second fabric portion 92 (e.g., between fibers thereof) such that the cushion portion 54 is bonded with the fabric assembly 260.

While blocks 404-408 are shown before the molding in block 410, block 404, block 406, and/or block 408 can be conducted after block 410. For example, the cord 96 can be inserted into the sleeve 94 and the hook(s) 114, 116 can be connected to the ends 110, 112 after molding the cushion portion 54.

Blocks 402-410 can be repeated for forming the additional fabric assembly 1260 that includes the additional first fabric portion 1090, second fabric portion 1092, and sleeve 1094, and molding the same cushion portion 54 with both fabric assemblies 260, 1260.

The method 400 includes attaching the trim cover 56 with the first side 60 of the cushion portion 54 (block 412), which can include hot gluing the trim cover 56 directly onto the foam of the cushion portion 54. The trim cover 56 may be attached to the cushion portion 54 independently of the cord 96, such as exclusively via the hot glue process. For example, the trim cover 56 may not be connected to the cushion portion 54 via the cord 96. The trim cover 56 may not be connected to the cushion portion 54 via cables, rings, wires, or other attachment components. For example, the trim cover 56 may not be attached to the cushion portion 54 via components that extend into and/or through the cushion portion 54. Additionally or alternatively, the seat frame 50 may not extend through the fabric assemblies 260, 1260. The cushion portion 54, the trim cover 56, the fabric assembly 260, the cord 96, and the hooks 114, 116 form the cushion assembly 52.

The method 400 includes connecting the fluid bladder 150 and/or the second fluid bladder 160 to the seat frame 50 and/or the cushion assembly 52 (block 414) and disposing the cushion assembly 52 on the seat frame 50 (block 416). For example, the cushion assembly 52 can be disposed such that the fluid bladder 150 is disposed at least partially between the fabric assembly 260 and the seat frame 50. In configurations with a plurality of fluid bladders, such as the fluid bladders 150, 160, block 414 can include connecting the plurality of fluid bladders to the seat frame 50 at least partially between the seat frame 50 and the cushion portion 54. The cushion assembly 52 can be disposed on the seat frame 50 in block 416 after attaching the trim cover 56 to the cushion portion 54 in block 412, at least in some configurations.

The method 400 then includes removing the ends 110, 112 and hooks 114, 116 from the pocket 170 (block 418) and connecting the ends 110, 112 of the cord 96 to the seat frame 50 (block 420), such as via engaging the hooks 114, 116 with the engagement formations 130, 132 (e.g., apertures). The ends 110, 112 of the cord are connected to the seat frame 50 such that the cord 96 restricts movement of the cushion away from the seat frame 50.

While embodiments are discussed in connection with the seat back 22, embodiments could, additionally or alternatively, be used for other portions of the seat assembly 20, such as the seat base 24. Accordingly, descriptions of the seat frame 50 and cushion assembly 52, such as the cushion portion 54, the seat back trim cover 56, the fabric assemblies 260, 1260, the cord 96, the hooks 114, 116, and the fluid bladders 150, 160, and the mold 220 can also be applied to the seat base frame 40 and the seat base cushion assembly 42. References to a seat frame 50 can include one or both of the seat base frame 40 or the seat back frame 50. References to a seat cushion assembly, or components thereof, can include one or both of the seat base cushion assembly 42 or the seat back cushion assembly 52.

The instant disclosure includes the following non-limiting embodiments:

1. A seat assembly, comprising: a frame; and a cushion assembly connected to the frame, the cushion assembly including: a cushion portion; a trim cover disposed at a first side of the cushion portion; a first fabric portion disposed at a second side of the cushion portion; a second fabric portion connected to the first fabric portion; a sleeve; and a cord disposed partially in the sleeve, the cord including a first end connected to the frame and a second end connected to the frame.

2. The seat assembly of any preceding embodiment, wherein the trim cover is hot glued to the first side of the cushion portion.

3. The seat assembly of any preceding embodiment, wherein the cushion portion is molded with the first fabric portion.

4. The seat assembly of any preceding embodiment, further comprising a first hook connected to the first end and a second hook connected to the second end.

5. The seat assembly of any preceding embodiment wherein the second fabric portion is sewed onto the first fabric portion; and the second fabric portion defines a pocket configured to at least partially receive the first hook and the second hook.

6. The seat assembly of any preceding embodiment, wherein the pocket includes a first opening, a second opening opposite the first opening, and an aperture between the first and second openings, the aperture configured to at least partially receive the first hook.

7. The seat assembly of any preceding embodiment, further comprising a bladder disposed at least partially between the frame and the cushion assembly.

8. The seat assembly of any preceding embodiment, wherein the cushion portion includes a bolster; and the cord is aligned with the bolster portion.

9. The seat assembly of any preceding embodiment, comprising a seat base and a seat back, the seat back including the frame and the cushion assembly.

10. A method of assembling a seat assembly, the method comprising: molding a cushion portion with a fabric assembly; disposing a cord partially in a sleeve of the fabric assembly; inserting a first end of the cord into a pocket of the fabric assembly; attaching a trim cover to a front side of the cushion portion; disposing the cushion portion on a seat frame;

removing the first end of the cord from the pocket; and connecting the first end of the cord with the seat frame.

11. The method of any preceding embodiment, including attaching a hook to the first end; wherein inserting the first end into the pocket include hooking the hook into a aperture of the pocket.

12. The method of any preceding embodiment, wherein the cushion portion is molded with the fabric assembly such that the fabric assembly is disposed at a rear side of the cushion portion.

13. The method of any preceding embodiment, wherein the cushion portion includes a middle portion and a bolster; and the fabric assembly is at least partially aligned with the bolster portion.

14. The method of any preceding embodiment, comprising forming the fabric assembly, including: sewing the sleeve onto a base fabric portion; and sewing the pocket onto the base fabric portion.

15. The method of any preceding embodiment, wherein molding the cushion portion with the fabric assembly includes disposing at least portions of the sleeve and the pocket in a recess of a mold cavity.

16. The method of any preceding embodiment, wherein the base fabric portion comprises fleece.

17. The method of any preceding embodiment, comprising connecting a plurality of bladders to the seat frame at least partially between the seat frame and the cushion portion.

18. The method of any preceding embodiment, comprising connecting the first end of the cord with the seat frame such that the cord restricts movement of the cushion portion away from the seat frame.

19. The method of any preceding embodiment, wherein the first end of the cord is inserted into the pocket of the fabric assembly prior to molding the cushion portion.

20. The method of any preceding embodiment, wherein the first end of the cord is removed from the pocket after disposing the cushion portion on the seat frame; and the cushion portion is disposed on the seat frame after attaching the trim cover to the cushion portion.

21. The seat assembly of any preceding embodiment, wherein the cord includes an elastic material.

22. The seat assembly of any preceding embodiment, wherein the trim cover is connected to the cushion portion independently of the cord.

23. A vehicle comprising the seat assembly of any preceding embodiment.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples," "in examples," "with examples," "various embodiments," "with embodiments," "in embodiments," "an embodiment," "with some configurations," "in some configurations," or the like, means that a particular feature, structure, or characteristic described in connection with the example/embodiment is included in at least one embodiment. Thus, appearances of the phrases "examples," "in examples," "with examples," "in various embodiments," "with embodiments," "in embodiments," "an embodiment," "with some configurations," "in some configurations," or the like, in places throughout the specification are not necessarily all referring to the same embodiment. Furthermore, the particular features, structures, and/or characteristics may be combined in any suitable manner in one or more examples/embodiments. Thus, the particular features, structures, or characteristics illustrated or described in connection with one embodiment/ example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element, unless the context clearly indicates otherwise. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above. The term "at least one of" in the context of, e.g., "at least one of A, B, and C" or "at least one of A, B, or C" includes only A, only B, only C, or any combination or subset of A, B, and C, including any combination or subset of one or a plurality of A, one or a plurality of B, and one or a plurality of C.

It will also be understood that, although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both elements, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. Uses of "and" and "or" are to be construed broadly (e.g., to be treated as "and/or"). For example and without limitation, uses of "and" do not necessarily require all elements or features listed, and uses of "or" are inclusive unless such a construction would be illogical. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All matter contained in the above description or shown in the accompanying drawings shall be interpreted as illustrative only and not limiting. Changes in detail or structure may be made without departing from the present disclosure.

What is claimed is:

1. A seat assembly, comprising:
   a frame; and
   a cushion assembly connected to the frame, the cushion assembly including:
      a cushion portion;
      a trim cover disposed at a first side of the cushion portion;
      a first fabric portion disposed at a second side of the cushion portion;
      a second fabric portion connected to the first fabric portion;
      a sleeve connected to the second fabric portion, such that each of the sleeve, the second fabric portion, and the first fabric portion are disposed at the second side of the cushion portion; and
      a cord disposed partially in the sleeve, the cord including a first end connected to the frame and a second end connected to the frame.

2. The seat assembly of claim 1, wherein the trim cover is hot glued to the first side of the cushion portion.

3. The seat assembly of claim 1, wherein the cushion portion is molded with the first fabric portion.

4. The seat assembly of claim 3, further comprising a first hook connected to the first end and a second hook connected to the second end.

5. The seat assembly of claim 4, wherein the second fabric portion is sewed onto the first fabric portion; and
   the second fabric portion defines a pocket configured to at least partially receive the first hook and the second hook.

6. The seat assembly of claim 5, wherein the pocket includes a first opening, a second opening opposite the first opening, and an aperture between the first and second openings, the aperture configured to at least partially receive the first hook.

7. The seat assembly of claim 1, further comprising a bladder disposed at least partially between the frame and the cushion assembly.

8. The seat assembly of claim 1, wherein the cushion portion includes a bolster, and the cord is aligned with at least a portion of the bolster.

9. The seat assembly of claim 1, comprising a seat base and a seat back, the seat back including the frame and the cushion assembly.

* * * * *